3,004,964
3-AMINO-2,4,6-TRIIODO-5-UREIDOBENZOIC ACID COMPOUNDS

Philip E. Wiegert, St. Louis, Mo., assignor to Mallinckrodt Chemical Works, St. Louis, Mo., a corporation of Missouri
No Drawing. Filed July 23, 1958, Ser. No. 750,306
6 Claims. (Cl. 260—211)

This invention relates to organic compounds and more particularly to certain novel benzoic acid derivatives.

Briefly the present invention is directed to certain novel compounds having the formula:

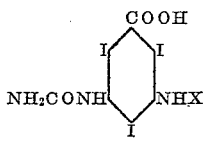

where X is hydrogen or a lower acyl radical, and non-toxic salts and esters thereof.

Among the objects of the present invention may be noted the provision of new benzoic acid derivatives; the provision of new halogenated compounds; and the provision of compounds of the type indicated which are useful for the preparation of roentgenographic contrast media. Other objects and features will be in part apparent and in part pointed out hereinafter.

The invention accordingly comprises the products hereinafter described, the scope of the invention being indicated in the following claims.

The present invention is directed to the novel benzoic acid derivatives represented by the formula:

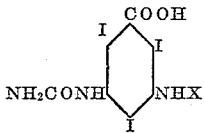

where X is hydrogen or a lower acyl radical, and non-toxic salts and esters thereof.

In the preparation of the novel compounds of the invention it is convenient to use commercially available 3,5-dinitrobenzoic acid as the starting material. This compound may be converted to 3-nitro-5-ureidobenzoic acid by reduction of one nitro group with sodium hydrosulfide or ammonium sulfide and treatment of the resulting amine with cyanic acid. The nitro compound may then be conveniently reduced by an appropriate process, such as catalytic hydrogenation, to form the corresponding amino compound. Iodine may then be introduced by means of an iodinating agent such as iodine monochloride, and the resulting triiodo compound may then conveniently be acylated by means of an acid anhydride or other appropriate acylating agent such as an acyl halide, to yield the corresponding 3-alkanamido-2,4,6-triiodo-5-ureidobenzoic acid. Salts and esters of these acids may be conveniently prepared by means well known to those skilled in the art.

The 3-alkanamido-2,4,6-triiodo-5-ureidobenzoic acids of the present invention are useful for the preparation of roentgenographic contrast media. For example, certain salts of these acids with non-toxic cations such as sodium and N-methylglucamine, are highly soluble in water, and sterile aqueous solutions of such salts are of low toxicity and contain a high concentration of organically bound and substantially physiologically inert iodine which can be administered intravenously. These iodinated compounds are excreted by the kidneys. Solutions of these acids or their salts in pharmaceutically acceptable solvents other than water are also useful for special purposes.

Dispersions of water insoluble derivatives of the acids, such as their esters for example, are also useful, as for example in visualizing hollow structures and cavities having external orifices through which the contrast preparation can be introduced in preparation for the examination and removed after the examination is completed.

The compounds are also useful for the preparation of other types of contrast media, such as non-aqueous dispersions, for example.

As is evident from the preceding description of the synthetic processes used in preparing the 3-alkanamido-2,4,6-triiodo-5-ureidobenzoic acids of the invention, the intermediate compound, 3-amino-2,4,6-triiodo-5-ureidobenzoic acid, is valuable for the preparation of these 3-alkanamido-2,4,6-triiodo-5-ureidobenzoic acids and other useful compounds.

The following examples illustrate the invention.

EXAMPLE 1

3-amino-5-ureidobenzoic acid (a) A solution of potassium cyanate (30 g., 0.37 mole) was added during 20 minutes to a stirred slurry of 3-amino-5-nitrobenzoic acid (53.2 g., 0.292 mole) in 1400 ml. of water and 22 ml. of acetic acid. The solid slowly dissolved with continued stirring and after an hour the excess acid was nearly neutralized (pH 5) with sodium hydroxide. The solution was treated with charcoal and strongly acidified to precipitate the product and dissolve any unreacted starting material. The precipitate was redissolved in excess sodium hydroxide solution, the solution was heated on the steam bath for two hours and treated with charcoal after the pH had been adjusted to approximately 5. Hydrochloric acid was added to reprecipitate 3-nitro-5-ureidobenzoic acid.

(b) 3-nitro-5-ureidobenzoic acid (40 g., 0.18 mole) was dissolved in a slight excess of sodium hydroxide solution, and the solution was made faintly acid and hydrogenated under pressure in the presence of a catalyst (3 g. of 5% palladium on charcoal). Slightly less than the theoretical quantity of hydrogen was absorbed in 3½ hours. The catalyst was filtered off, leaving a solution of 3-amino-5-ureidobenzoic acid.

EXAMPLE 2

3-amino-2,4,6-triiodo-5-ureidobenzoic acid

The solution of 3-amino-5-ureidobenzoic acid of Example 1 was diluted to 1000 ml. and 37% hydrochloric acid (15 ml.) was added. Iodine monochloride (51.5 g. of 95% ICl in 51 ml. of 37% hydrochloric acid) was added to the resulting slurry, which was stirred and heated on the steam bath for 3 hours. The remaining iodine monochloride was reduced with sodium bisulfite. The slurry was cooled and the crude 3-amino-2,4,6-triiodo-5-ureidobenzoic acid filtered off. Yield, 34.0 g. (66.7%), N.E. 585 (theory 573).

EXAMPLE 3

3-acetamido-2,4,6-triiodo-5-ureidobenzoic acid

A mixture of crude 3-amino-2,4,6,-triiodo-5-ureidobenzoic acid (88 g., 0.154 mole), acetic anhydride (200 ml.), and sulfuric acid (10 drops) was heated on the steam bath for one hour. The suspension was slowly poured into hot water (250 ml.) to hydrolyze the excess acetic anhydride. The suspension was cooled and filtered and the cake washed with a little water. The cake was dissolved in dilute sodium hydroxide, and the solution was faintly acidified, treated twice with charcoal and acidified to precipitate the product. This reprecipitation was repeated twice. Yield of 3-acetamido-2,4,6-triiodo-5-ureidobenzoic acid, 25.5 g., N.E., 614 (theory, 615), M.P. 219.3–220.3° C.

EXAMPLE 4

Sodium salt of 3-acetamido-2,4,6-triiodo-5-ureidobenzoic acid 3-acetamido-2,4,6-triiodo-5-ureidobenzoic acid was dissolved in an equivalent quantity of dilute sodium hydroxide solution, and the water was evaporated, leaving a residue of the sodium salt of 3-acetamido-2,4,6-triiodo-5-ureidobenzoic acid. A saturated solution of the sodium salt contained 22.3 g./100 ml. of solution or 25 g./100 ml. of water at 24° C.

EXAMPLE 5

N-methylglucamin salt of 3-acetamido-2,4,6-triiodo-5-ureidobenzoic acid

A solution was prepared by suspending 3-acetamido-2,4,6-triiodo-5-ureidobenzoic acid (24.2 g.) in a little water, neutralizing with N-methylglucamine, and diluting to 50 ml. The solution was filtered, methyl p-hydroxybenzoate (0.05 g.) was added as a preservative and the solution was heated at 80° C. for 15 minutes. The solution contained 64% (w./v.) of the N-methylglucamine salt of 3-acetamido-2,4,6-triiodo-5-ureidobenzoic acid.

A 40% solution of the N-methylglucamine salt of 3-acetamido-2,4,6-triiodo-5-ureidobenzoic acid was injected intravenously into male albino mice at several graduated dosage levels. At the end of a 48 hour observation period all of the animals receiving a dosage of 10,000 mg./kg. or less were alive. At a dosage level of 21,500 mg./kg. four of the five animals injected died within this observation period.

A 40% solution of the N-methylglucamine salt of 3-acetamido-2,4,6-triiodo-5-ureidobenzoic acid was injected intravenously into an anesthetized dog at a dosage of 200 mg./kg. The kidneys were distinctly visualized in X-ray films exposed beginning ten minutes after administration of the contrast medium. The urinary bladder was sharply visualized within ten minutes, the density of the shadows rapidly increasing in succeeding films to an intensity equal to that of the animal's bones.

Other 3-lower alkanamido-2,4,6-triiodo-5 - ureidobenzoic acids, such as 3-formamido-2,4,6-triiodo-5-ureidobenzoic acid, 3-propionamido-2,4,6-triiodo - 5 - ureidobenzoic acid, and 3-butyramido-2,4,6-triiodo-5-ureidobenzoic acid may be prepared by treating 3-amino-2,4,6-triiodo-5-ureidobenzoic acid with appropriate acylating agents by processes generally similar to that described above.

In view of the above, it will be seen that the several objects of the invention are achieved and other advantageous results obtained.

As various changes could be made in the above products without departing from the scope of the invention, it is intended that all the matters contained in the above description shall be interpreted as illustrative and not in a limiting sense.

I claim:

1. A compound of the formula:

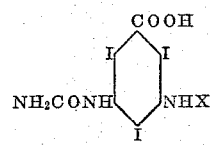

where X is selected from the group consisting of hydrogen and low acyl radicals, and the non-toxic salts and esters thereof.

2. 3-amino-2,4,6-triiodo-5-ureidobenzoic acid.

3. A 3-lower alkanamido-2,4,6-triiodo-5-ureidobenzoic acid.

4. 3-acetamido-2,4,6-triiodo-5-ureidobenzoic acid.

5. The sodium salt of 3-acetamido-2,4,6-triiodo-5-ureidobenzoic acid.

6. The N-methylglucamine salt of 3-acetamido-2,4,6-triiodo-5-ureidobenzoic acid.

References Cited in the file of this patent

UNITED STATES PATENTS

| | | |
|---|---|---|
| 2,611,786 | Wallingford | Sept. 23, 1952 |
| 2,776,241 | Priewe et al. | Jan. 1, 1957 |
| 2,820,814 | Ginsberg | Jan. 21, 1958 |
| 2,826,611 | Fischback | Mar. 11, 1958 |

FOREIGN PATENTS

| | | |
|---|---|---|
| 168,059 | Australia | Aug. 31, 1956 |